US009906399B2

(12) United States Patent
Venkatramanan et al.

(10) Patent No.: US 9,906,399 B2
(45) Date of Patent: Feb. 27, 2018

(54) METHODS AND SYSTEMS FOR COMBINED MANAGEMENT OF MULTIPLE SERVERS

(75) Inventors: Hareni K. Venkatramanan, Tamil Nadu (IN); Prabhakar M. Shenoy, Karnataka (IN); Tata M. Sankaram, Andhra Pradesh (IN); Krishna P. Reddy, Andhra Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 1250 days.

(21) Appl. No.: 12/547,731

(22) Filed: Aug. 26, 2009

(65) Prior Publication Data
US 2014/0289661 A1    Sep. 25, 2014

(51) Int. Cl.
*G06F 15/177*  (2006.01)
*G06F 17/00*  (2006.01)
*G06F 11/00*  (2006.01)
*G06F 12/00*  (2006.01)
*H04L 12/24*  (2006.01)

(52) U.S. Cl.
CPC .......... *H04L 41/022* (2013.01); *H04L 41/20* (2013.01); *H04L 41/22* (2013.01); *H04L 41/0803* (2013.01)

(58) Field of Classification Search
CPC ... H04L 41/22; H04L 41/082; H04L 41/0853; H04L 41/046
USPC .......................... 715/735, 763, 744; 709/223
See application file for complete search history.

(56) References Cited

U.S. PATENT DOCUMENTS 6,567,849 B2    5/2003  Ludovici et al.
6,966,033 B1 *  11/2005  Gasser et al. .............. 715/738
7,703,027 B2 *  4/2010  Hsu et al. .................. 715/763
2002/0140743 A1 *  10/2002  DeLuca et al. ............. 345/835
2002/0149601 A1 *  10/2002  Rajarajan et al. ........... 345/619
2002/0194225 A1 *  12/2002  Karaila ...................... 707/513
2003/0061323 A1 *  3/2003  East et al. .................. 709/223

(Continued)

OTHER PUBLICATIONS

Verma, D.C., Simplifying network administration using policy-based management, 2002, Network, IEEE (0890-8044) 2002. vol. 16,Iss.2;p. 20-26.*

(Continued)

*Primary Examiner* — Jordany Nunez
(74) *Attorney, Agent, or Firm* — Kilpatrick Townsend & Stockton LLP (57) ABSTRACT

A method can comprise accessing data identifying instances of an application server such as a group of server instances that are administered together. The method can comprise presenting a user interface including a visual element corresponding to each instance of the application server. The interface may include a server settings panel listing a plurality of setting values for a first instance of the application server in detail and an instance panel comprising visual elements for each instance of the application server in the group. The method can comprise receiving input changing a value of a setting of an instance of the application server and sending an update request to the application server to change the value of the setting. The update request may comprise a command to apply a hotfix or update. The interface may support drag-and-drop gestures applying settings or hotfixes/updates to multiple servers via a single interface and/or a difference view showing differences in setting values and supporting a merge command.

23 Claims, 6 Drawing Sheets

(56) References Cited

U.S. PATENT DOCUMENTS

2003/0149756 A1* 8/2003 Grieve et al. ............... 709/223
2005/0262507 A1* 11/2005 Langen et al. ............... 718/100
2005/0268238 A1* 12/2005 Quang et al. ............... 715/734
2009/0106680 A1* 4/2009 Brownholtz et al. ......... 715/769

OTHER PUBLICATIONS

How to Apply Configuration Settings to Multiple Exchange Servers, Microsoft TechNet, found at http://technet.microsoft.com/en-us/library/bb124511(printer).aspx, last downloaded Aug. 17, 2009.

How to Copy Speech Server Settings to All Computers in a Deployment Group, Microsoft MSDN, found at http://msdn.microsoft.com/en-us/library/bb858193(printer).aspx, last downloaded Aug. 17, 2009.

Scott Forsyth's Blog, found at http://weblogs.asp.net/owscott/archive/2006/06/07/IISCnfg.vbs---IIS-Sett . . . , last downloaded Aug. 17, 2009.

* cited by examiner

METHODS AND SYSTEMS FOR COMBINED MANAGEMENT OF MULTIPLE SERVERS

TECHNICAL FIELD

The disclosure below generally relates to information technology, particularly to management and administration of multiple server computing devices.

BACKGROUND

An organization may use multiple hardware platforms to provide desired functionality. For example, multiple hardware platforms may be used to provide instances of an application server. The application server may, for example, automatically generate code or objects based on a scripting language or other input provided by developers. To configure each application server, an administrator may be required to login to an administrator screen for each instance and manually adjust settings. Another potential issue is applying hotfixes (e.g., software patches) and updates (e.g., version changes or service packs) to fix bugs and provide enhancements—the administrator may need to manually login to each machine and apply the hotfix/update and then restart each instance of the server. These and other issues may become problematic, especially in deployments which may use 5 to 50 (or more) servers.

SUMMARY

In accordance with one or more aspects of the present subject matter, an administrative program can provide for management of multiple server instances from one administrative interface.

Embodiments include a method comprising accessing data identifying a plurality of instances of an application server. For example, the data may comprise a group of server instances that are administered together. The method can further comprise presenting a user interface using a display device interfaced to a computing system, the user interface including a visual element corresponding to each of the plurality of instances of the application server. For instance, the interface may include a server settings panel listing a plurality of setting values for a first instance of the application server in detail and a server instance panel comprising visual elements such as icons corresponding to each instance of the application server in the group. The method can comprise receiving input via the user interface, the input changing a value of at least one setting of at least one instance of the application server and sending an update request to the application server(s) to change the value of the setting. Update requests may be generated for any number of servers to be automatically updated in response to a single input gesture.

For example, the input may comprise a drag-and-drop gesture selecting a value of a setting in the server settings panel as applied to the first server and dragging the setting value to the server instance panel, with the update request comprising a request to the second instance of the application server to change the value of the setting as applied to the second server to match the value of the setting as applied to the first server. As another example, the interface may include a difference view showing a setting value as applied to a first and second server and highlighting differences (if any) as between the values. The input may comprise a merge command made after selection of one or more setting values as applied to the first instance of the application server, with the update request sent to the second instance of the application server to change the value of the selected setting to the setting value as applied to the first instance of the application server. As a further example, the input may comprise selection of an update or hotfix to apply to a plurality of selected application servers and the update request can comprise suitable commands to the selected servers to apply the update/hotfix.

Embodiments also include systems and computer-readable media comprising code for administration of multiple instances of an application server together. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
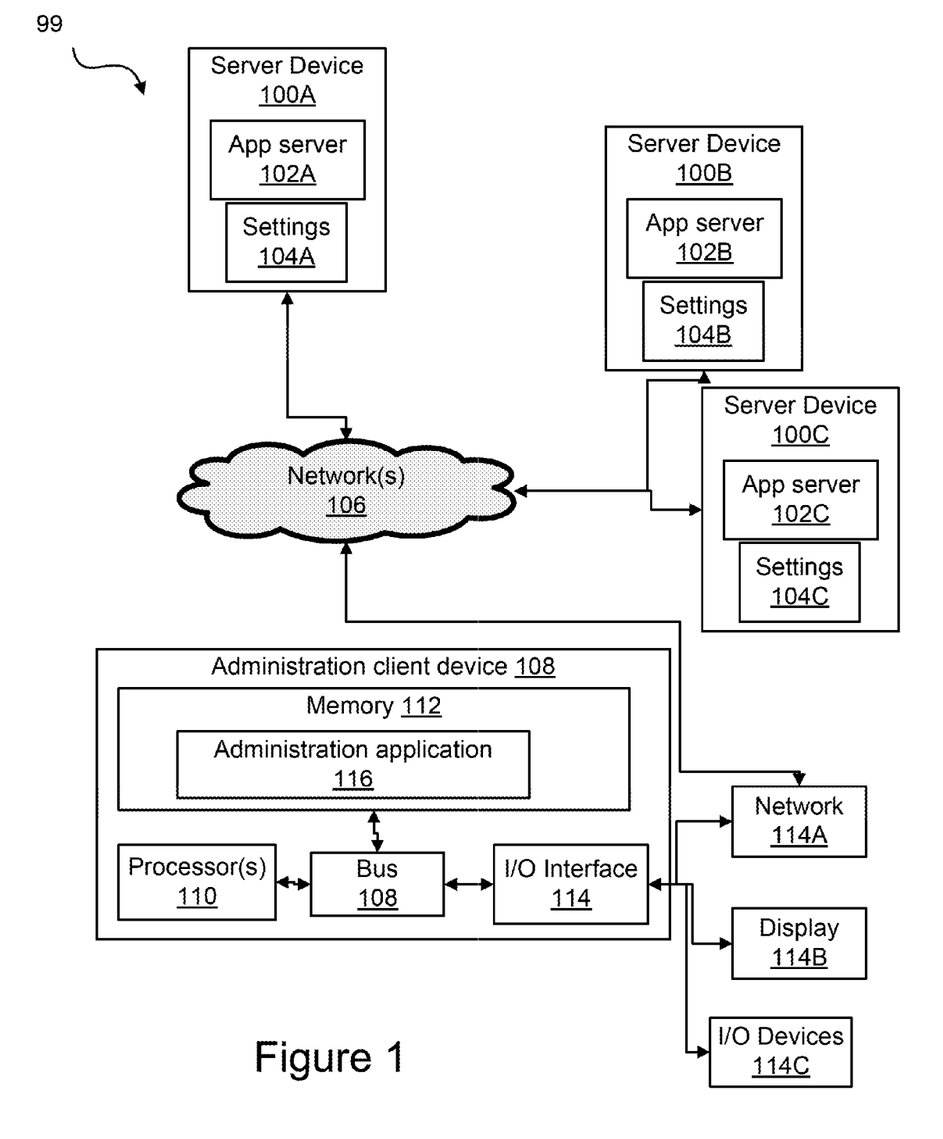
FIG. 1 is a block diagram illustrating an exemplary network architecture including a plurality of application servers and an administrator client configured in accordance with aspects of the present subject mater.

FIG. 1 is a block diagram illustrating an exemplary network architecture 99 including a plurality of application server devices 100 and an administrator client device 108 configured in accordance with aspects of the present subject mater. Particularly this example shows an application server device 100A at a first location and application server devices 100B and 100C at a separate location. It will be understood that the number, type, and location of application server devices can vary. Each application server device 100 includes at least one instance of an application server 102 (indicated as 102A, 102B, and 102C in FIG. 1).

Application servers 102 are linked via one or more networks 106 (e.g., the internet, local area networks) for access by one or more clients (not shown). For example, a client may call an application server at a URL for code generation functionality, such as generation of a dynamic web page. Load balancing components may select an instance of application server 102 to handle the response for the client, while other client requests are handled by other instances of application server 102. The load balancing and other components may themselves include instances of application server 102.

Application server 102 may comprise one or more applications, packages, and/or components that provide code generation and other functionality. One example of an application server is Adobe® Coldfusion®, available from Adobe Systems Incorporated of San Jose, Calif. Although this example depicts application server instances, the present subject matter includes embodiments in which multiple instances of another program component are managed, such as a web server or other server.

Each instance of application server 102 relies on respective settings data 104. For example, settings can include path information for various components included in or used by the application server, hardware constraints, data sources relied on in the operation of the application server, and other information. In some embodiments, the settings include JVM (Java Virtual Machine) settings, server hardware settings, data sources, scheduled tasks, mappings, logging settings, charting settings, request tuning, mail settings, and memory variables. The settings applied to an instance of application server 102 may be adjustable via an interface provided by the server. For example, application server 102 may support an administrator interface provided in response to a request to a specified URL and after authentication. The interface may be provided in a web page and/or may comprise a series of commands that can be made from a remote device (e.g., remote login to a command-line interface). More generally, any server configuration settings or commands that can be exposed through an API (Application Programming Interface) can be applied via embodiments of the present subject matter.

Tracking performance and settings of each server individually can become problematic. For example, FIG. 1 illustrates three application servers, but an entity may rely on any number of instances of the application server, such as between 5 and 50 instances. Manually adjusting settings and performing other tasks, such as applying updates, may become labor-intensive.

Embodiments of the present subject matter can help alleviate this problem by providing an administration interface for configuring multiple instances of application server 102 alongside one another. As shown in FIG. 1, an administration client computing device 108 can be configured with one or more program components 116 comprising an administration application. Administration application 116 can configure client device 108 to utilize its processor 110 and I/O components 108 to receive user input, provide output, and interface with one or more of server devices 100A, 100B, and 100C to receive settings data and provide update requests in accordance with the present subject matter.

In this example, administration client computing device 108 includes one or more processors 110, a bus 108, memory 112, input-output (I/O) handling components 114, a display 114A, user input (UI) devices 114C (e.g., a mouse, keyboard, touch screen interface, etc.), one or more networking or other interfaces 114A (e.g., Ethernet, USB, etc.). Other components, e.g., storage such as hard disk, optical drive(s), and the like, may also be included. Memory 112 represents one or more computer-readable media such as RAM, ROM, or other memory accessible by processor(s) 110 and can embody one or more program components that configure the operation of the computing system. Although this architecture is shown for device 108, server devices 100 may feature a similar hardware architecture.

In the example of FIG. 1, each server device 100 features a single instance of application server 102. In practice, multiple instances of application server 102 may be provided by a single computing device (e.g., through virtualization). Additionally, some or all components of administration application 116 may be hosted by a server. For example, administration application 116 may comprise a rich internet application, with data gathered at a server and provided to a client-side component that handles user input and output.

Figure 2:
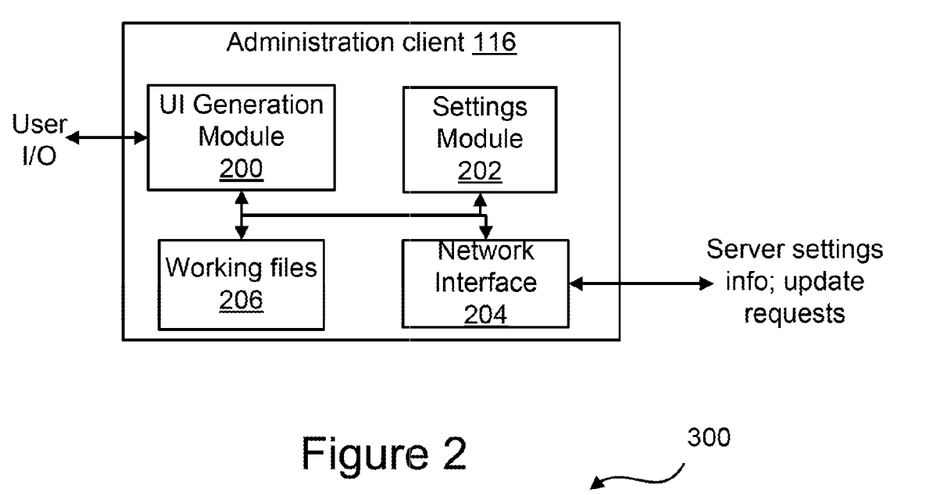
FIG. 2 is a block diagram illustrating components of an exemplary administrator client.

FIG. 2 is a block diagram illustrating components of administration application 116. In this example, administration application 116 comprises a plurality of program components that configure the operation of the client device. The components include a user interface module 200 that configures the computing system to present a server administration interface which, as will be noted below, can comprise a visual element corresponding to each of a plurality of instances of an application server.

Settings control module 202 is configured to manage and interpret settings data from the instances of the application server. For example, settings control module 202 can be configured to construct an update request to update the value of a setting as applied to at least one instance of the application server in response to user input and provide the update request to network interface module 204 to send. As another example, settings control module 202 can be configured to construct an update request with appropriate commands and parameters to apply an update or hotfix to an instance of the application server. Settings control module 202 can also use interface module 204 to request and receive data reflecting the settings as applied to various servers and maintain local files for use by UI generation module 200 in providing user interfaces to convey that information.

Network interface module 204 configures the computing system to maintain appropriate connections to access settings data representing one or more values of settings as applied to each instance of the application server and/or send requests to the instances of the application server in response to changes desired by a user.

In some embodiments, administration application 116 is locally-hosted and network interface module 204 handles connections to server devices 100 hosting instances of application server 102 that are being administered. However, in some embodiments functionality of administration application 116 can be remotely hosted. For example, a client-side component may comprise UI generation module

200 and a network interface module 204 configured to interact with a remote administration server. The administration server can handle interfacing with server devices 100 and the instances of application server 102 that are being managed and can relay information and commands to and from the client-side component.

FIG. 2 also illustrates working files 206. These files may, for example, comprise one or more structured files representing settings data for the server instances being administered and/or other data used in operation of administration application 116. For example, the other data can include login and password information for use in logging on to the server instances being administered, network addresses and other data for contacting server devices 100, data identifying groups of servers administered together, and user preference and customization data.

Figure 3:
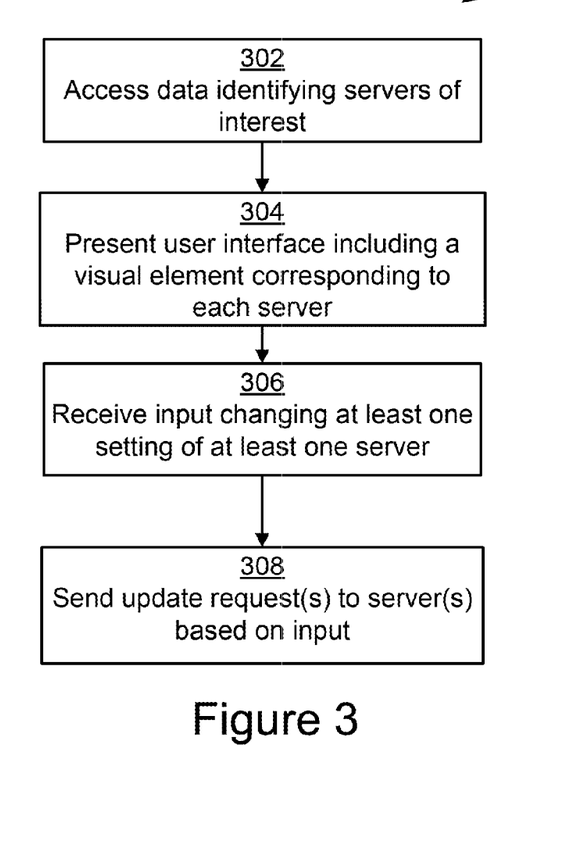
FIG. 3 is a flowchart showing steps in an exemplary method for displaying an interface for administrating multiple servers alongside one another.

FIG. 3 is a flowchart showing steps in an exemplary method 300 for displaying an interface for administrating multiple servers alongside one another. Block 302 represents accessing data identifying a plurality of instances of an application server. For example, a user of the administration application may define a group comprising a plurality of instances that the user wishes to administer together. For example, the UI module may include an "add" command or menu where a user can set up groups, input connection information, and otherwise provide information needed for the administration application to find and group instances of the application server.

Block 304 represents presenting a user interface using a display device interfaced to a computing system, the user interface including a visual element corresponding to each instance of the application server. For example, as will be noted below, an interface can be presented with a plurality of icons, with each icon representing an application server instance. As another example, a list view may be provided with the various application server instances each having a respective list entry.

Block 306 represents receiving input via the user interface, the input changing a value of at least one setting of at least one instance of the application server, while block 308 represents sending an update request to the at least one application server to change the value of the setting. Changing a setting can comprise adjusting the value of one or more parameters for the application server instance. As another example, changing a setting can comprise applying an update or hotfix, restarting the server, shutting down the server, or starting an idle server.

Figure 4:
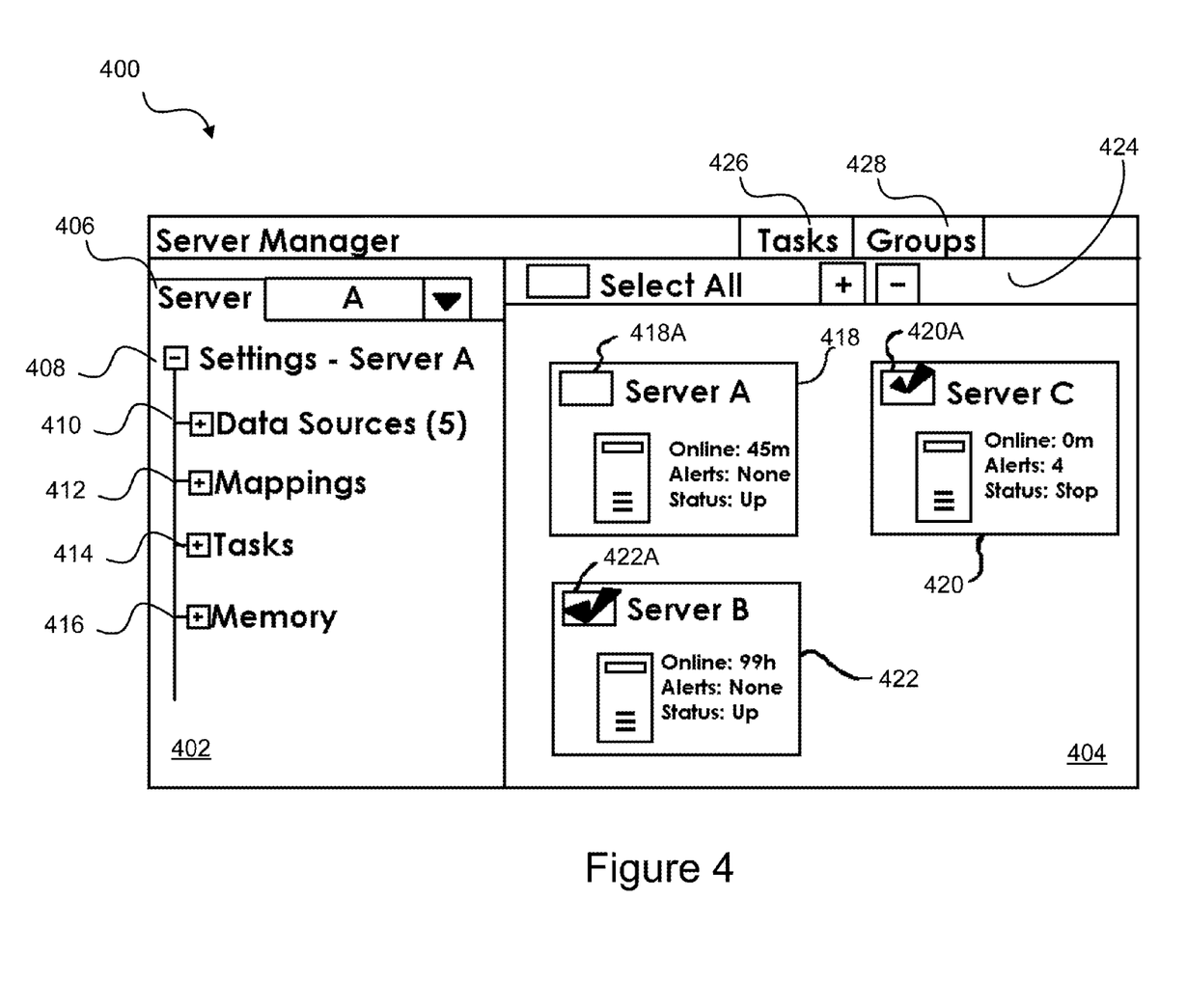
FIG. 4 is a diagram illustrating an example of a user interface for administrating multiple servers alongside one another.

FIG. 4 is a diagram illustrating an example of a user interface 400 for administrating multiple servers alongside one another. In this example, user interface comprises a server settings panel 402 listing a plurality of setting values for a first instance of the application server ("Server A") and a server instance panel 404 comprising visual elements corresponding to the first instance, a second instance ("Server B"), and a third instance ("Server C"). Each instance features a respective icon 418, 420, 422 with detail information (e.g., online time, messages/alerts, current status, etc.) and a selection box (labeled 418A, 420A, and 422A, respectively).

Turning back to setting panel 402, a drop-down selection menu 406 allows selection of one instance of the plurality of application server instances shown in panel 404. Settings for the selected instance are shown in detail in panel 402. Thus, as shown at tree view 408, a plurality of settings for Server A are visible; here, the settings are grouped as Data Sources 410, Mappings 412, Tasks 414, and Memory 416. Additional settings groups can be included and viewed by using a scrollbar. In this example, each setting group can be expanded to expose individual setting values. For example, the "Data Sources" group may be expanded to reveal several different data sources and particular settings for each data source.

As mentioned earlier, server instance panel 404 illustrates a visual element for each instance of a plurality of instances of an application server. Although instances can be selected individually via checkboxes 418A, 420A, and 422A, interface 400 also includes menu bar 424 for selecting all instances in panel 404. Additionally the "+" and "−" buttons may allow a new instance to be added to the group, or a current instance to be removed from the group, respectively.

Interface 400 also includes tasks menu 426 and groups menu 428. Tasks menu 426 may allow a user to select from various administrative tasks such as launching an update or hotfix. For example, the user may provide a command to apply a hotfix to one or more instances of the application server selected in the server instance panel. Groups menu 428 may trigger an interface for defining and managing instances of application servers that are grouped together. For example, from the group menu, a user may add or remove instances of application servers, change network and login information for accessing the application servers, and otherwise provide information for use in operating the administration application.

In some embodiments, interface 400 can be used to adjust settings for multiple servers simultaneously. For example, a user may provide input such as a click-and-drag or drag-and-drop gesture starting from panel 402 and ending in panel 404. Such input can be interpreted as a command to update the instances selected in panel 404 with the value of the setting(s) dragged from panel 402.

The input may comprise selection of a second instance of the application server via a checkbox field the server instance panel, a click gesture selecting a value of a setting in the server settings panel as applied to the first server, and a drag gesture dragging the setting value to the server instance panel. The administration application can provide a request to the second instance of the application server to change the value of the setting as applied to the second server to match the value of the setting as applied to the first server.

For instance, if a user clicks at mappings group 412 and drags it into panel 404, the values for the various mappings settings as applied to Server A (the server whose settings are shown in panel 402) will be applied to Server B and Server C (i.e., the servers selected in panel 404). Similarly, a single setting value rather than a group can be shown by expanding the settings groups and clicking and dragging the single setting to panel 404.

Figure 5:
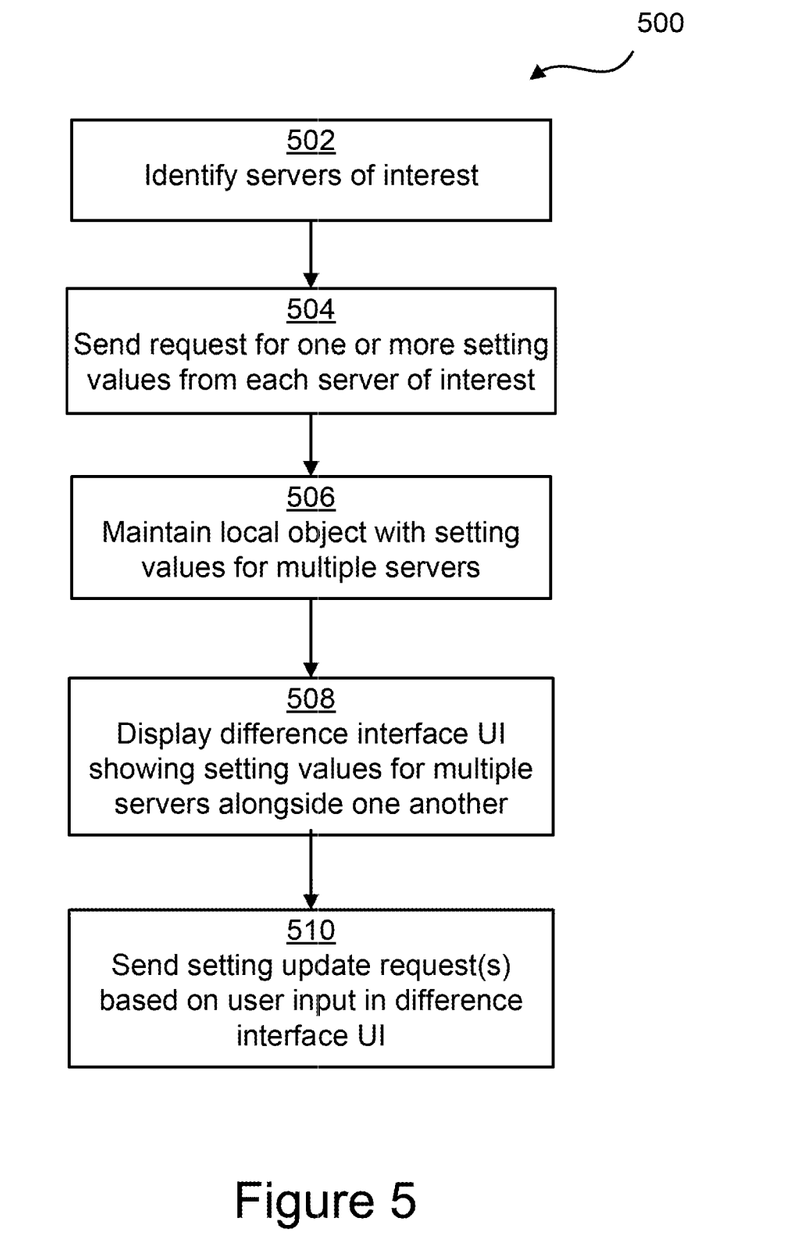
FIG. 5 is a flowchart showing steps in an exemplary method for displaying an interface illustrating differences in settings as between two or more servers.

FIG. 5 is a flowchart showing steps in an exemplary method 500 for displaying an interface illustrating differences in settings as between two or more servers. Block 502 represents identifying servers of interest. For example, a plurality of servers may be selected in panel 404 to trigger a difference interface showing differences in setting values as applied to multiple servers.

Block 504 represents sending a request for one or more setting values from each server of interest. This may occur in response to data identifying the servers of interest or such a request may be carried out in regular operation of the administration application. Additionally or alternatively, the administration application may request current setting values for all settings applied to each instance of an application server in a group.

In response, a structured object can be received from each instance of the application server from which setting values were requested. For example, each server may return an XML-formatted file with the setting values in various nodes of a tree structure. Block 506 represents maintaining a local structured object having the setting as a node, the value of the setting as applied to the each instance application server included in the node. For example, the administration application may maintain a local XML object having the same nodes in a tree structure. However, for each setting, an entry can be included for the setting value as applied to each server instance being administered.

Block 508 represents using the local structured object to display the setting values in the difference interface. For example, the XML entries can be parsed and used to generate a display of the setting name, server instance names, and values for the setting for each of one or more settings of interest as applied to the instances of the application server.

The difference interface may analyze the setting values to determine whether the value of one or more settings differs as between the servers. For example, if values for a particular setting are maintained in a node for that setting, the difference interface can rely on a comparison of the values under each node to determine if there are differences. Differences may include presence or absence of a particular setting value, numerical differences, and/or differences in strings (e.g., component paths, data source names, etc.). In some embodiments, a visual effect such as highlighting or animation is added to the difference interface to indicate when setting values differ as between two or more servers.

The difference interface can support receipt of input as will be noted below. Block 510 represents sending a setting update request based on the user input. For example, the input may comprise selection of a setting value as applied to a first server instance and a merge command; a suitable update request can be sent so that the setting value as applied to the first server instance is also applied to the merge targets.

Figure 6:
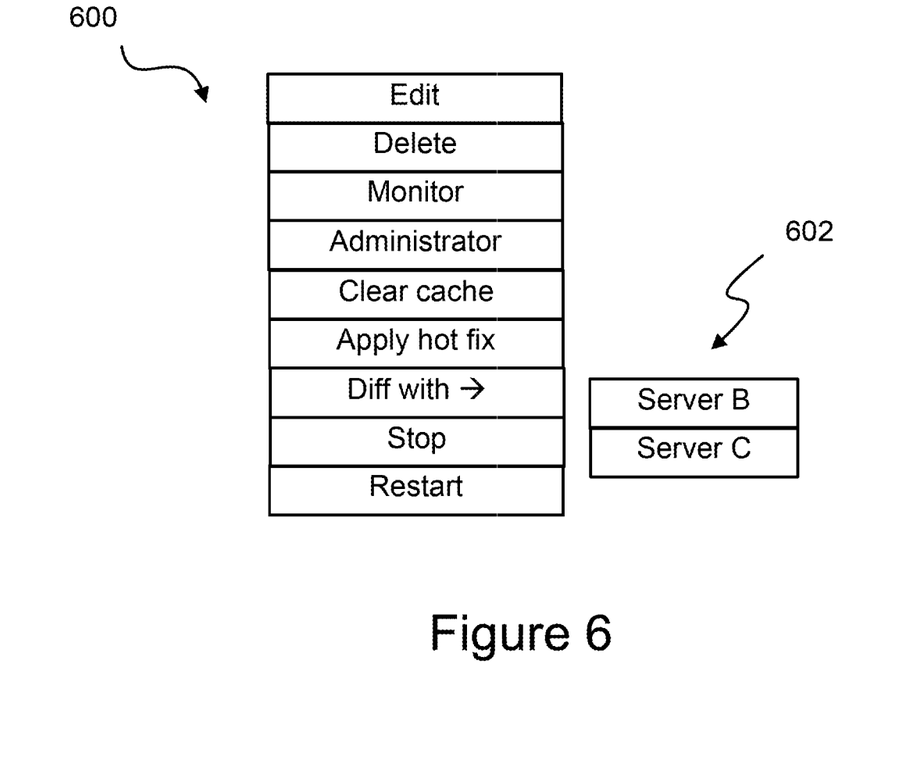
FIG. 6 is a block diagram illustrating an example of administration options including displaying a difference in settings as between two or more servers.

FIG. 6 is a block diagram illustrating an example menu 600 showing administration options including displaying a difference in settings as between two or more servers. For example, menu 600 may be presented as a contextual menu when a user right-clicks on a visual element in panel 404 corresponding to a particular server instance. In this example, the menu options include an "edit" command, a "delete" command, a "monitor" command, an "administrator" command, a "clear cache" command, an "apply hot fix" command, a "diff with" command, a "stop" command, and a "restart" command.

The "edit" command may trigger an interface (such as the "groups" interface noted above) for adjusting settings of the administration application used to access and control the selected server. The "delete" command may remove the server form the current group. The "monitor" command may launch a monitoring or reporting page for the server, while the "administrator" command may launch a page for administering the selected server individually. For example, each instance of the application server may support monitoring/administration via an HTML or other interface that can be provided directly by the server and these commands can comprise shortcuts to such functionality.

The "clear cache," "apply hot fix," "stop," and "restart" commands are shown to illustrate that the administrator interface may directly adjust the configuration of servers and/or provide commands. For example, "clear cache," "stop," and "restart" may cause the administration application to send suitable commands to the selected instance to clear its cache, stop, or restart, respectively. The "apply hot fix" command can be used to launch a dialog for selecting a hotfix or update package to apply to the selected instance. These commands may be triggered after selecting a single instance or after selecting multiple instances. For example, all instances may be restarted by using the "select all" command shown in FIG. 4 and then triggering menu 600 and choosing "restart."

Menu 600 also includes a "diff with" option that triggers a sub-menu 602. In this example, sub-menu 602 includes "Server B" and "Server C" as options. For instance, sub-menu 602 may have this appearance if "Diff With" is chosen when "Server A" is selected in panel 404. The "diff with" command may launch a series of dialogs in which a user can provide input selecting some or all available settings for inclusion in a difference interface. Additionally, rather than selecting server instances in menu 602, a dialog may be included where a user can select the server instances to compare in the difference interface.

Figure 7:
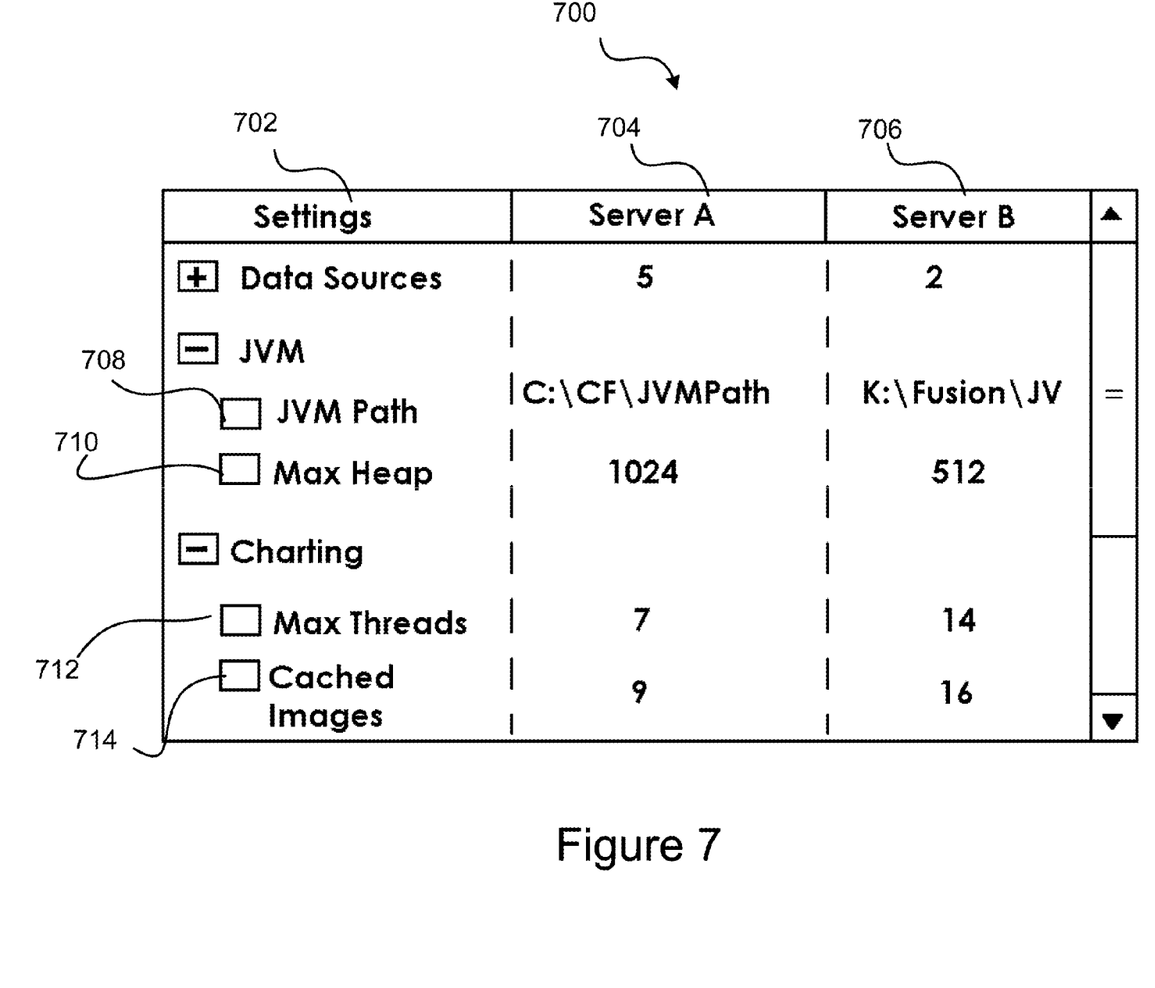
FIG. 7 is a diagram illustrating an example of a user interface illustrating differences in settings as between two or more servers.

FIG. 7 is a diagram illustrating an example of a difference interface 700 which shows differences in settings as between two or more servers. In this example, difference interface includes a settings column 702 featuring the names of settings and groups organized as a tree, along with columns 704 and 706 with headers corresponding to servers A and B, respectively. In practice, the interface can include a column corresponding to each server instance whose settings are to be compared using the interface. Values for settings and summary information for setting groups can be included under the column corresponding to each respective server instance.

As shown at 700, the "Data Sources" group is not expanded, although a summary value "5" appears in column 704 and a summary value "2" appears in column 706. A user may click on the expansion indicator to list the data sources by name. For this particular setting, the value will comprise "present" or "not present"; this interface may allow an administrator to easily tell whether all servers in a group have access to the same underlying data sources.

Entries 708 and 710 correspond to particular settings for a Java Virtual Machine (JVM) supported by the servers. In this example, the path used for each instance is shown at 708 and the "Max Heap" size is shown at 710. Although the path may vary as between servers, an administrator may note that the heap size differs. If one of servers A and B has much better (or worse) performance in handling Java tasks, this side-by-side comparison may help optimize the underperforming instance. "Charting" settings are shown, particularly the maximum number of threads setting is shown at 712 and a maximum number of cached images setting is shown at 714.

Difference interface 700 may include visual effects to indicate differences in setting values as between server instances. For example, highlighting or animation may be added for particular setting groups or setting values where servers do not feature the same settings.

In some embodiments, difference interface 700 supports user input. For example, each setting (and/or setting group) can feature a checkbox. A user may select particular setting values as applied to one server to merge into the other server(s) shown in the difference interface. For example, a user may determine that the "Max Heap" size for Server B should match that of Server A. The user may select the check box by entry 710 and then provide a "merge" command via a contextual menu or other interface element.

In some embodiments, the "merge" command automatically merges the settings of the server in the left-most column to the other servers shown in the interface, and so no further selection would be needed. Interface 700 may support rearranging the columns by clicking and dragging. For example, if the user determines that the "Max Threads" setting for Server B should be merged to server A, then the user may swap columns 706 and 704, select "Max Threads" at 712, and then supply the merge command.

Additionally or alternatively, checkboxes, buttons, or other interface elements can be included in the difference interface (e.g., in the column headers) to determine which server(s) should be the target and which server should be the source for setting values in a merge situation.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
   accessing data identifying a plurality of instances of an application server;
   presenting a user interface using a display device interfaced to a computing system, the user interface comprising:
   a visual element corresponding to each instance of the application server; and
   a difference interface displaying setting values for multiple instances of the application server, wherein setting values are configurable elements for the multiple instances of the application server exposed through an Application Programming Interface and wherein the setting values are displayed for selected settings based on input selecting less than all available settings for inclusion in the difference interface, the difference interface further displaying a visual effect to indicate setting values that differ as between a first instance and a second instance of the application server;
   receiving a received input via the user interface, the received input changing a value of at least one setting of at least one instance of the application server; and
   sending an update request to the at least one application server to change the value of the setting.

2. The method set forth in claim 1, wherein the user interface comprises:
   a server settings panel listing a plurality of setting values for a first instance of the application server; and
   a server instance panel comprising the visual element corresponding to the first instance and a second instance of the application server.

3. The method set forth in claim 2, wherein the received input comprises:
   selection of the second instance of the application server via the server instance panel; and
   a drag-and-drop gesture selecting a value of a setting in the server settings panel as applied to the first server and dragging the setting value to the server instance panel,
   wherein the update request comprises a request to the second instance of the application server to change the value of the setting as applied to the second server to match the value of the setting as applied to the first server.

4. The method set forth in claim 3, wherein the received input comprises selection of a plurality of instances of the application server via the server instance panel and the update request comprises a request to each of the selected plurality of instances of the application server to change the value of the setting to match the value of the setting as applied to the first server.

5. The method set forth in claim 1, further comprising:
   displaying a user interface showing a setting value as applied to a first and second server.

6. The method set forth in claim 5, wherein the received input comprises selection of a setting value as applied to the first server and the update request comprises a request to the second server to change the value of the setting at the second server to match the value of the setting as applied to the first server.

7. A computing system comprising:
   a processor; and
   a non-transitory computer-readable medium embodying program components, the program components comprising:
   a user interface module that configures the computing system to present a server administration interface, the server administration interface comprising:
   a visual element corresponding to each of a plurality of instances of an application server; and
   a difference interface displaying setting values for multiple instances of the application server, wherein setting values are configurable elements for the multiple instances of the application server exposed through an Application Programming Interface and wherein the setting values are displayed for selected settings based on input selecting some available settings for inclusion in the difference interface, the difference interface further displaying a visual effect to indicate setting values that differ as between a first instance and a second instance of the application server;
   a network interface module that configures the computing system to access settings data representing a value of a setting as applied to each instance of the application server; and
   a settings control module configured to construct an update request and provide the update request to the network interface module to send to the plurality of instances of the application server,
   wherein the update request comprises at least one of a command to change a value of a setting or a command to apply a hotfix or update.

8. The computing system set forth in claim 7, wherein the server administration interface comprises:
   a server settings panel listing a plurality of setting values for a first instance of the application server; and
   a server instance panel comprising the visual element corresponding to the first instance and a second instance of the application server.

9. The computing system set forth in claim 8,
   wherein the server administration interface is configured to support a gesture comprising dragging of a setting value from the server settings panel to the server instance panel in which a second instance of the application server is selected, and
   wherein the settings control module is configured to, in response to the gesture, generate a settings update request to the second instance of the application server to change the value of the selected setting to match the value of the setting as applied to the first instance of the application server.

10. The computing system set forth in claim 8,
    wherein the server administration interface is configured to provide a command to apply a hotfix to one or more instances of the application server selected in the server instance panel, and
    wherein the settings control module is configured to, in response to the command, generate a hotfix request to the selected instances of the application server.

11. The computing system set forth in claim 7, wherein the server administration interface is configured to provide a command to trigger the difference interface.

12. The computing system set forth in claim 11, wherein the settings control module is configured to:
generate a settings request to send to the first and second instance of the application server in response to receiving the command to trigger the difference interface;
receive a structured object from each of the first and second instance of the application server; and
create a local structured object having the setting as a node, the value of the setting as applied to the first and second instance of the application server included in the node,
wherein the local structured object is used to display the setting values in the difference interface.

13. The computing system set forth in claim 11, wherein the difference interface is configured to provide a merge command upon selection of one or more setting values as applied to the first instance of the application server,
wherein the setting control module is configured to, in response to the merge command, generate a settings update request to send to the second instance of the application server to change the value of the selected setting to the setting value as applied to the first instance of the application server.

14. A computer program product comprising a tangible non-transitory computer-readable medium embodying program code executable by a computing system, the program code comprising:
program code for accessing data identifying a plurality of instances of an application server;
program code for presenting a user interface using a display device interfaced to a computing system, the user interface comprising:
a visual element corresponding to each instance of the application server; and
a difference interface displaying setting values for multiple instances of the application server, wherein setting values are configurable elements for the multiple instances of the application server exposed through an Application Programming Interface and wherein the setting values are displayed for selected settings based on input selecting some available settings for inclusion in the difference interface, the difference interface further displaying a visual effect to indicate setting values that differ as between a first instance and a second instance of the application server;
program code for receiving a received input via the user interface, the received input changing a value of at least one setting of at least one instance of the application server; and
program code for sending an update request to the at least one application server to change the value of the setting.

15. The computer program product set forth in claim 14, wherein the user interface comprises:
a server settings panel listing a plurality of setting values for a first instance of the application server; and
a server instance panel comprising the visual element corresponding to the first instance and a second instance of the application server.

16. The computer program product set forth in claim 15, wherein the received input comprises:
selection of the second instance of the application server via the server instance panel; and
a drag-and-drop gesture selecting a value of a setting in the server settings panel as applied to the first server and dragging the setting value to the server instance panel,
wherein the update request comprises a request to the second instance of the application server to change the value of the setting as applied to the second server to match the value of the setting as applied to the first server.

17. The computer program product set forth in claim 16, wherein the received input comprises selection of a plurality of instances of the application server via the server instance panel and the update request comprises a request to each instance of the application server to change the value of the setting to match the value of the setting as applied to the first server.

18. The computer program product set forth in claim 14, further comprising:
program code for displaying a user interface showing a setting value as applied to a first and second server.

19. The computer program product set forth in claim 18, wherein the received input comprises selection of a setting value as applied to the first server and the update request comprises a request to the second server to change the value of the setting at the second server to match the value of the setting as applied to the first server.

20. The method of claim 1 wherein the received input changing the value comprises:
a selection of a value of a setting as applied to a first server; and
a merge command to change the value of the setting as applied to a second server to match the value of the of the setting as applied to the first server.

21. The method of claim 1 wherein the at least one setting is a setting for a Java Virtual Machine (JVM) comprising a path used for the at least one instance of the application server or a maximum heap size used for the at least one instance of the application server.

22. The method of claim 1 wherein the at least one setting is a charting setting comprising a maximum number of threads used for the at least one instance of the application server or a maximum number of cached images used for the at least one instance of the application server.

23. The method of claim 1 further comprising:
requesting setting values for each of the plurality of instances of the application server
receiving the setting values for each of the plurality of instances of the application server; and
maintaining a local, XML structured object comprising the setting values for each of the plurality of instances of the application server.

* * * * *